United States Patent [19]

Chau

[11] Patent Number: 4,950,404

[45] Date of Patent: Aug. 21, 1990

[54] HIGH FLUX SEMIPERMEABLE MEMBRANES

[75] Inventor: Michael M. Chau, San Diego, Calif.

[73] Assignee: Allied-Signal Inc., Morris Township, Morris County, N.J.

[21] Appl. No.: 400,440

[22] Filed: Aug. 30, 1989

[51] Int. Cl.$^5$ .................. B01D 61/00; B01D 67/00; B01D 69/00

[52] U.S. Cl. .................. 210/500.27; 210/500.37; 264/45.5

[58] Field of Search ............. 210/490, 500.38, 500.37, 210/500.39, 500.41, 653, 654; 264/41, 45.1, 45.5, 48, DIG. 48, DIG. 62

[56] References Cited

U.S. PATENT DOCUMENTS

| | | | |
|---|---|---|---|
| 4,277,344 | 7/1981 | Cadotte | 210/490 |
| 4,772,394 | 9/1988 | Swedo et al. | 210/500.38 |
| 4,792,404 | 12/1988 | Swedo et al. | 210/490 |
| 4,802,984 | 2/1989 | Waite | 210/500.34 |

Primary Examiner—Frank Sever
Attorney, Agent, or Firm—Harold N. Wells; Gerard P. Rooney

[57] ABSTRACT

High flux semipermeable membranes which comprise a polymerized reaction product within and/or on a porous support may be prepared by contacting the porous support such as a polysulfone sheet with an aqueous solution of an polyamine, said aqueous solution containing a polar aprotic solvent not reactive with amines and optionally an acid acceptor. The surface of the coated support is dried to the touch and then contacted with an organic solution of an polycarboxylic acid halide for a period of time sufficient to form a polymerized reaction product within and/or on the surface of the support material. The resulting composite may be post treated by washing with an alkaline compound. The resultant membrane composite may be used in separation processes such as the desalination of brackish or seawater, or the softening of domestic hard water.

20 Claims, No Drawings

HIGH FLUX SEMIPERMEABLE MEMBRANES

BACKGROUND OF THE INVENTION

This invention is generally concerned with the purification of liquids. Of particular interest is the treatment of water which contains unacceptable amounts of dissolved salts, such as seawater, brackish water or hard water. Such waters may be purified by forcing the water through a semipermeable reverse osmosis membrane, leaving behind the contaminants or salts which do not pass through the membrane. This method may be used for softening of hard waters, but heretofore the pressures required to operate the separation process made use of reverse osmosis for such a purpose less attractive.

A reverse osmosis membrane must reject a high fraction of the dissolved salts. In addition, if chlorine is added to water as a disinfectant, the membrane generally must be tolerant to the chlorine. It is particularly important that such membranes pass a relatively large amount of water (i.e., have a high flux) through the membrane at relatively low pressures.

Reverse osmosis membranes have been made from a wide variety of known polymeric materials. While many of these polymeric materials can reject a large fraction of the salt, some cannot provide a sufficiently high flux of water.

Many U.S. patents describe various membranes which are useful in desalination processes, see for example, those cited and discussed in U.S. Pat. No. 4,830,885. One of the earliest patents to describe membranes of the type used in the present invention is U.S. Pat. No. 3,744,642 to Scala et al.

The semipermeable membrane used in the desalination process ordinarily will be relatively thin in order to increase the flux. Thus the membrane often is formed on a porous support. Scala et al. suggest reacting a broad group of amines or bisphenols with acyl halides or sulfonyl halides on a support material to form thin membranes. This provides strength to the composite. The supports should possess pore sizes which are sufficiently large so that the water (permeate) can pass through the support without reducing the flux of the entire composite. Conversely, the pore size should not be so large that the thin semipermeable membrane will be unable to bridge the pores or will tend to fill up or penetrate too far into the pores. Scala et al. suggest that above about 8 microns the rejection of impurities is reduced.

U.S. Pat. No. 4,277,344 discloses a reverse osmosis membrane made in situ according to Scala et al., which has been prepared from a polyacyl halide and an arylene polyamine. According to the '344 patent, no advantage was found for surfactant and acid-accepting additives and it is preferred to carry out the interfacial polymerization without the presence of acid acceptors. The '344 patent teaches that the membrane contains a plurality of sites having the formula:

Ar(CONH—)2COOH 

in which Ar represents the aromatic nucleus residue of the polyfunctional aryl halide. It is of interest with respect to the present invention that according to the '344 patent, solvents for the polyacyl halides that dissolve or plasticize the support material should not be used. In accord is U.S. Pat. No. 4,619,767 to Kamiyama et al. which states that it is necessary to avoid solvents for the crosslinking agents (e.g. acid halides) which dissolve or swell the porous substrate.

It has been generally believed that if solvents for the support material are used, the surface of the support is disrupted and it is difficult, if not impossible, to produce a uniform desalinizing layer. Also, it has been generally believed that use of a solvent for the support will obscure the pore structure of the support, increasing the resistance to water flow through the support, and thus reducing the flux. Research sponsored by the U.S. Dept. of the Interior on seawater desalination and described in the reports by the contracting organizations also support this view of the prevailing opinion of those skilled in the art.

In U.S. Patent No. 4,830,885 an improved supported membrane is disclosed in which a polyhydric compound (which does not dissolve typical support materials), is included with the amine solution in preparation of the membrane. The polyhydric compound provides improved flux through the membrane while maintaining the high rejection of the dissolved salts.

The present invention provides still further improvement in the performance of supported membranes by using polar aprotic solvents which are capable of dissolving or plasticizing the support material.

SUMMARY OF THE INVENTION

The invention provides improved membranes which have a surprisingly improved flux and yet retain effective salt rejection and tolerance to chlorine and other oxidants.

In general, the membrane will be formed by the reaction of polyacyl halides, polysulfonyl halides, or polyisocyanates, with polyamines or bisphenols. The membranes preferably will comprise the reaction product resulting from the reaction of an aliphatic or aromatic polyamine with an aliphatic or aromatic polycarboxylic acid halide, the membrane being deposited within and/or on a porous support backing material. Such membranes are prepared in the presence of a solvent capable of dissolving or plasticizing the porous support, which unexpectedly provides enhanced water flux through the membrane.

The polyamine preferably is an aromatic diamine and more preferably is at least one member of the group consisting of m-phenylenediamine, p-phenylenediamine, p-phenylenediamine, 4- chlorophenylenediamine, and 5-chlorophenylenediamine. The polycarboxylic acid halide preferably is an aromatic polycarboxylic halide and more preferably is a member of the group consisting of isophthaloyl chloride, trimesoyl chloride, trimellitoyl chloride and terephthaloyl chloride.

The solvent capable of dissolving or plasticizing the support material preferably is a polar aprotic solvent which does not react with amines and more preferably is at least one member of the group consisting of N-methylpyrrolidone, 2-pyrrolidones, N,N-dimethylformamide, dioxane, pyridine, lutidines, picolines, tetrahydrofuran, sulfolane, sulfolene, hexamethyl phosphoramide, triethyl phosphite, N,N-dimethylacetamide, acetonitrile, and N,N-dimethylpropionamide. The solvent will be present in the aqueous polyamine solution in a concentration of 0.01 to 75% by weight, preferably 0.1-20%, most preferably 1-20%.

One embodiment of this invention is a high flux semipermeable membrane prepared by coating on a porous support backing material an aqueous solution of an aromatic polyamine which contains a polar aprotic solvent for the backing material, removing excess solution, drying the surface of the coated support, contacting the dried surface of the support material with an aromatic polycarboxylic acid halide in an organic solvent to form a reaction product within and/or on the surface of the porous support material, and curing the resultant composite to form the finished high flux semipermeable membrane.

A specific embodiment of this invention is a high flux semipermeable membrane prepared by casting an aqueous solution having a pH of about 8 to 14 containing about 0.1 to 20 wt. % of m-phenylenediamine, said aqueous solution containing 1–20 weight % N-methylpyrrolidone and sodium carbonate (an acid acceptor) on a polysulfone backing material, removing excess solution, drying a surface of the coated support until it is dry to the touch, contacting the dried face of the support with a naphtha solution of about 0.01 % to 10 wt. % trimesoyl chloride, and curing the resultant composite at a temperature in the range of from about 20° to about 150° C for a period of time in the range of from about 1 second to about 2 hours. Optional finishing steps may include subjecting the composite to treatment with sodium carbonate at a temperature in the range of from about 20° to about 100° C at a pH in the range of from about 9 to about 11.

DETAILED DESCRIPTION OF THE INVENTION

The membranes may be prepared by the method generally described by Scala et al. An aqueous solution of a polyamine or a bisphenol, preferably a polyamine, is coated on a porous support material and the excess removed by drawing, rolling, sponging, air knifing or other suitable techniques. Thereafter the surface of the coated support material is dried and then is contacted with an organic solution of a polyacyl halide, polysulfonyl halide or polyisocyanate, preferably a polyacyl halide. Since the porous support material surface is dry, the polymerized reaction product is formed within and/or on the porous support. The resulting composite is then cured to provide a semipermeable membrane which exhibits high water flux and good salt rejection as well as tolerance to chlorine.

It has now been discovered that by adding to the aqueous polyamine or bisphenol solution a polar aprotic solvent for the porous support material, the membrane formed by drying the surface of the coated support and then contacting the dry surface of the support with an organic solution of an polyacyl, polysulfonyl halide, or polyisocyanate exhibits a high water flux superior to the membranes made according to the teachings of prior art which did not utilize a solvent for the porous support. In addition, as a result of the high water flux the new membranes permit operation at much lower pressures while retaining an acceptable flux, which is particularly valuable for softening of domestic hard water.

In one embodiment, the semipermeable membranes of the present invention may be prepared by coating a porous support material with an aqueous solution of an aromatic polyamine. The porous support material comprises a polymeric material containing pores which are of sufficient size to permit the passage of permeate therethrough. In the preferred embodiment of the invention, the pore size of the porous support material will range from about 1 to about 5,000 millimicrons. Examples of porous support materials which may be used to prepare the desired membrane composite of the present invention may include such polymers as polysulfone, polycarbonate, microporous polypropylene, the various polyamides, polyamines, polyphenylene ether, and various halogenated polymers such as polyvinylidine fluoride. As noted in U.S. 4,277,344 and 4,619,767 it has been previously thought that solvents which could dissolve or plasticize the backing material should not be used. It might be expected that such solvents could both close smaller pores and open larger ones so that both the flux and the salt rejection could be adversely affected. However, contrary to such speculations and the teachings of the art, the present inventor has found that advantages can be obtained by proper use of such solvents.

The porous support backing material may be coated with an aqueous solution of monomeric polyamines or, to render the resulting membrane more resistant to environmental attacks, of monomeric substituted polyamines. These monomeric polyamines may comprise cyclic polyamines such as piperazine; substituted cyclic polyamines such as methyl piperazine, dimethyl piperazine; aromatic polyamines such as m-phenylenediamine, o-phenylenediamine, p-phenylenediamine, biphenylene diamines; substituted aromatic polyamines such as chlorophenylenediamine, N,N'-dimethyl-1,3-phenylenediamine; multi-aromatic ring polyamines such as benzidine; substituted multi-aromatic ring polyamines such as 3,3'dimethylbenzidine, 3,3'dichlorobenzidine and diaminonaphthalenes; or mixtures thereof, depending on the separation requirements as well as the environmental stability requirements of the resulting membranes. Particularly preferred are aromatic diamines selected from the group consisting of m-phenylenediamine, o-phenylenediamine, p-phenylenediamine, 4-chlorophenylenediamine, and 5-chlorophenylene diamine.

The solution which is utilized as the carrier for the polyamine will comprise water in which the polyamine will be present in the solution in an amount in the range of from about 0.1 to about 20% by weight. The aqueous solution may also contain basic acid acceptors such as sodium hydroxide, potassium hydroxide, sodium carbonate, potassium carbonate, and triethylamine. The acid acceptor may be present in a relatively small amount ranging from about 5 to about 1000 parts per million. The pH of the aqueous solution is maintained in the range of from about 8 to about 14.

It has been found that if the solution includes a solvent for the porous support in amounts ranging from 0.01 to about 75% by weight, preferably 0.1 to 20%, most preferably 1 –20%, that the rate of transfer of water through the membrane (i.e. the flux) is enhanced. The concentration selected will depend on, among other things, the residence time of the support material in the polyamine solution. That is, a short residence time would permit a higher concentration of the polar aprotic solvent. Such solvents will be polar aprotic solvents which do not react with amines and preferably will be at least one member of the group consisting of N-methyl pyrrolidone, 2-pyrrolidones, N,N-dimethylformamide, dioxane, pyridine, lutidines, picolines, tetrahydrofuran, sulfolane, sulfolene, hexamethylphosphoramide, triethylphosphite, N,N-dimethylacetamide, acetonitrile, and N,N-dimethylpropionamide.

After coating the porous support backing material with the aqueous solution of the polyamine, the excess solution is removed by techniques previously discussed, and a surface of the coated support is dried until it is dry to the touch, typically for about 2 to 20 minutes at room temperature. While the dried surface is dry to the touch, additional moisture is believed to be present since oven drying of such supports will produce a weight loss. It is expected that the surface of the porous support will be enriched in the solvent (e.g., N-methylpyrrolidone) during the surface drying period since water is more volatile than N-methylpyrrolidone ($BP_{H_2O}=100°C$, $BP_{NMP}=200°C$, vapor pressure @20°C = 17.5 mm Hg for the H2O and 0.3 mm Hg for NMP). The coated support is then contacted with an organic solvent solution of a polyacyl halide, preferably only on the side of the support which is dry to the touch. Examples of aromatic polycarboxylic acid halides which may be employed will include di- or tricarboxylic acid halides such as trimesoyl chloride (1,3,5-benzene tricarboxylic acid chloride), trimellitoyl chloride (1,2,4-benzene tricarboxylic acid chloride), isophthaloyl chloride, terephthaloyl chloride, trimesoyl bromide (1,3,5-benzene tricarboxylic acid bromide), trimellitoyl bromide (1,2,4-benzene tricarboxylic acid bromide), isophthaloyl bromide, terephthaloyl bromide, trimesoyl iodide (1,3,5-benzene tricarboxylic acid iodide), trimellitoyl iodide (1,2,4-benzene tricarboxylic acid iodide), isophthaloyl iodide, terephthaloyl iodide, as well as mixtures of di-tri, tri-tri carboxylic acid halides, that is, trimesoyl halide and the isomeric phthaloyl halides. The di- or tricarboxylic acid halides may be substituted to render them more resistant to further environmental attack. Particularly preferred are aromatic acid halides selected from the group consisting of isophthaloyl chloride, trimesoyl chloride, trimellitoyl chloride, and terephthaloyl chloride. Again, in the preferred embodiment of the invention, the aromatic polycarboxylic acid halide is present in the organic solvent solution in a range of from about 0.01 to about 10% by weight of the solution. The organic solvents which are employed in the process of this invention will comprise those which are immiscible with water and may comprise paraffins such as n-pentane, n-hexane, n-heptane, cyclopentane, cyclohexane, methylcyclopentane, naphtha, and the like, or halogenated hydrocarbons.

Inasmuch as the support surface coated with the polyamine is dried before contact with the organic solution, the polymerization of the two components of the membrane will occur within and/or on the surface of the support. The addition of a solvent for the backing material may affect the membrane forming reaction since such solvents will be generally somewhat miscible in the organic phase. The contact time used for the formation of the thin film membrane will vary over a relatively wide range of from about 1 second to about 60 seconds, but the reaction is believed to occur in less than one second.

Following the formation of the reaction product within and/or on the surface of the porous support backing material, the resultant composite may be cured to remove any remaining solvent and reactants. The time and temperature for the curing process will be interdependent, the primary criteria for the curing of the membrane being that the curing time and temperature are sufficient to provide the desired membrane, but not excessive. For example, too much heat or time may completely dry the membrane or affect the pore size of the backing material, thus decreasing the flux or rejection of the membrane. Accordingly, curing at ambient temperatures for a time less than is required to dry the membrane is preferred. More generally, the curing of the composite membrane may be effected over a temperature range ambient (20°-25°C.) up to about 150° C for a period of time ranging from about 1 second to about 2 hours or more in duration.

The composite high flux membrane may be subjected to one or more optional post treatments. The membrane may be washed with an aqueous solution having a pH in the range of from about 9 to about 11. The solution may include a basic compound such as sodium hydroxide, potassium hydroxide, lithium hydroxide, sodium carbonate, potassium carbonate, lithium carbonate, and the like. The wash temperature may be in the range of from about 20° to about 100° C for a period of time in the range of from about 1 to about 15 minutes.

Following the wash of the membrane, any unreacted aromatic polyamine which may still be present can be removed by leaching, although such a step is not generally necessary. Leaching of the unreacted aromatic polyamine may be done by treating the membrane with a 0.01 to 5 wt. % solution of sodium bisulfite at a temperature in the range of from about 20° to about 100°C for a period of time in the range of from about 1 to about 60 minutes.

High flux semipermeable membranes may be prepared in a continuous manner. When this method is employed, a porous support backing material is continuously passed through a bath of an aqueous solution of the polyamine or bisphenol which contains a polar aprotic solvent according to the invention and optionally an acid acceptor. After passage through the bath, the backing material is continuously withdrawn and any excess solution is removed by suitable techniques familiar to those skilled in the art. A surface of the coated support is dried to the touch and then continuously passed through the organic solvent solution of the polyacyl halide. polysulfonyl halide, or polyisocyanate. Formation of the membrane on only the dry face of the support is preferred and thus only one surface will be contacted with the organic solution. The polymerization reaction will occur while the organic solution is in contact with the amine coating, following which the composite comprising the polymerized reaction product in the form of a thin film semipermeable membrane within and/or on the surface of the porous support backing material will be cured, for example, by passage through a chamber which is maintained at the desired curing temperature, the passage through said chamber being at a predetermined rate so as to avoid any possible damage to the composite membrane. Curing at ambient temperature is preferred since the membrane should not be completely dried. Complete drying may lead to an irreversible loss of performance. Thereafter, the optional finishing steps may be carried out and the finished membrane is subsequently recovered.

The resultant high flux semipermeable membrane may then be employed for the separation process desired such as the desalination of seawater or brackish water, other treatments of water such as softening of hard water, boiler water treatment, concentration of whey or fruit juices, and the like. The membranes which are in the form of flat sheets are particularly applicable for use in modules either in single sheet or multiple sheet units whereby the sheet or sheets are wound in a spiral type configuration.

In the following examples, except as noted, a high flux membrane was formed by polymerization on a 0.076 mm thick porous polysulfone film backed with polyester fabric. The film was brought into contact first with an aqueous solution of m-phenylenediamine and N-methylpyrrolidone (NMP) and then with naphtha solution of trimesoyl chloride (TMC).

The film was in contact with the amine solution for 10.5 seconds at room temperature, after which it was wiped free of excess solution on the fabric side but blown dry to the touch on the film side by two air knives. The film side was then contacted for 6.5 seconds with the naphtha solution of the acyl halide. The film was then dried for about 3 minutes at room temperature and then rinsed, although the rinsing procedures are not considered essential. Two rinse baths were used, the first operated at room temperature and contained an aqueous solution of 170 wt. ppm $Na_2CO_3$ and 53 wt. ppm $NaHSO_3$, the second was held at 40°C. and contained 100 wt. ppm $NaHSO_3$. After rinsing, the film was allowed to dry at room temperature for about 14 minutes in a chamber at which time it was considered finished and ready for use.

EXAMPLE I

A high flux membrane was prepared by the method just described using an aqueous solution containing 3 wt. % m-phenylenediamine, 3.0 wt. % NMP and 100 wt. ppm of sodium carbonate and a naphtha solution containing 0.1 wt. % TMC. The finished film was tested by placing samples in a stainless steel flat cell and passing a synthetic brackish water feed containing 2 gm/liter of sodium chloride across the surface of a 25 ×76 mm membrane at a feed rate of 4.27 liters/minute. The tests were carried out with pressures of 520 kPa gauge (75 psig) or 1520 kPa gauge (220 psig) on one side of the membrane while the other side was maintained at atmospheric pressure. A temperature of 24° C was maintained with a pH of 7.5. The permeate was measured and the rejection of sodium chloride and the flux determined. The results are shown in the table below.

EXAMPLE II (Comparative)

A membrane was prepared and tested and described as above except that no NMP was added to the aqueous amine solution. The results are included in the table below.

EXAMPLE III

High flux membranes according to the invention were prepared as described above using (A) 1 wt. %, (B) 2 wt. %, and (C) 20 wt. % NMP instead of the 3 wt. % NMP of Example 1. Test results of these membranes are shown in the table below.

EXAMPLE IV

A high flux membrane according to the invention was prepared as described above except that 5 wt. % dimethylformamide (DMF) was substituted for NMP as the protic polar solvent. The test results of this membrane are shown in the table below.

EXAMPLE V (Comparative)

For comparison the results of membranes 8 and C from the table at column 9 of U.S. Patent 4,830,885 are included in the table below. These results provide a comparison of the use of ethylene glycol in the aqueous amine solution.

TABLE

| | Aqueous Solution | | | | Flux | | % Salt Rejection | |
| | | | | wt. % | @ 520 kPa (75 psig) | @ 1520 kPa (220 psig) | @ 520 kPa | @ 1520 kPa |
| Example | wt. % MPDA | wt. % solvent | pH | TMC | $l/m^2h$(gfd) | $l/m^2h$(gfd) | (75 psig) | (220 psig) |
|---|---|---|---|---|---|---|---|---|
| II | 3 | none | 9.5 | 0.12 | 14.6(8.6) | 47.7(28.1) | 83.4 | 97.8 |
| III A | 3 | 1NMP | 10.4 | 0.12 | N/A | 55.1(32.5) | N/A | 97.7 |
| III B | 3 | 2NMP | 10.4 | 0.10 | N/A | 65.7(38.7) | N/A | 97.7 |
| I | 3 | 3NMP | 10.35 | 0.10 | N/A | 79.1(46.6) | N/A | 97 |
| III C | 3 | 20NMP | 9.0 | 0.12 | 25 (14.7) | 87.6(51.6) | 82.4 | 92.7 |
| IV | 3 | 5DMF | 10.8 | 0.12 | 18.2(10.7) | 55.5(32.7) | 93.5 | 96.8 |
| V B | 2.1 | 20EG | 9.4 | 0.10 | N/A | 56 (33.0) | N/A | 98.7 |
| V C | 2.1 | 50EG | N/A | 0.15 | N/A | 55 (32.4) | N/A | 95.3 |

It can be seen that the addition of N-methylpyrrolidone up to 3% provides membranes with about 40% increase in flux while retaining good salt rejection (see Examples I–III), further increase in NMP will provide increased flux but at the expense of some loss of salt rejection. Dimethyl formamide also provides an increased flux and good salt rejection. By comparison, the use of large amounts of ethylene glycol (EG) provide increased flux also but are proportionally much less effective compared to the polar aprotic solvents of the invention.

Upon inspection of the membranes of the invention under a transmission electron microscope at 60,000 to 90,000 magnifications it was seen that the surface of the membranes of the invention was smooth while those membranes made without using polar aprotic solvents were much rougher, indicating that the addition of even a small amount of the solvents of the invention has an observable physical effect on the surface of the membranes, which may have contributed to the improved results obtained.

EXAMPLE VI

A thin film reverse osmosis membrane is prepared by polymerization as described in Example 1 using an aqueous solution of 3 wt. % p-phenylenediamine plus 20 wt. % 2-pyrrolidone and 0.01 wt. % $Na_2CO_3$ and followed by a solution of 0.2 wt. % isophthaloyl chloride in naphtha. The membrane is tested according to Example I and the flux and salt rejection are determined.

EXAMPLE VII

Another thin film reverse osmosis membrane is prepared as in Example I using an aqueous solution of 3 wt. % o-phenylenediamine plus 10 wt. % N,N-dimethylformamide and 0.01 wt. % $Na_2CO_3$ and followed by a solution of 0.2 wt. % terephthaloyl chloride in naphtha.

EXAMPLE VIII

As in Example I a reverse osmosis membrane is prepared using an aqueous solution of 3 wt. % 4-chlorophenylenediamine plus 10 wt. % hexamethylphosphoramide and 0.01 wt. % $Na_2CO_3$ and followed by a solution of 0.2 wt. % trimesoyl chloride in naphtha.

EXAMPLE IX

As in Example I a reverse osmosis membrane is prepared using an aqueous solution of 3 wt. % 5-chlorophenylenediamine plus 10 wt. % hexamethylphosphoramide and 0.01 wt. % Na2CO3 and followed by a solution of 0.2 wt. % trimesoyl chloride in naphtha.

I claim:

1. A semipermeable membrane having properties for providing increased flux while retaining salt rejection and chlorine resistance prepared by coating a porous support with an aqueous solution of an polyamine or bisphenol which contains a polar aprotic solvent not reactive with amines having properties for dissolving or plasticizing said support, removing excess of said solution, contacting the coated porous support with an organic solvent solution of an polyacyl halide, polysulfonyl halide, or polyisocyanate to form a reaction product within and/or on the surface of said porous support, and curing the resultant composite at curing conditions to form said high flux semipermeable membrane.

2. The high flux membrane of claim 1 further characterized in that the surfaces of the coated support are air dried before contacting one of said surfaces with said organic solvent solution.

3. The high flux membrane of claim 1 wherein said aqueous solution contains a polyamine.

4. The high flux membrane of claim 3 in which said polyamine is an aromatic amine.

5. The high flux membrane of claim 4 wherein said aromatic polyamine is at least one member of the group consisting of m-phenylenediamine, o-phenylenediamine, p-penylenediamine, of m-phenylenediamine, o-phenylenediamine, p-phenlenediamine, 4-chlorophenylenediamine, and 5-chlorophenylenediamine.

6. The high flux membrane of claim 1 in which said polyacyl halide is an aromatic polycarboxylic acid halide.

7. The high flux membrane of claim 6 wherein said aromatic acid halide is at least one member of the group consisting of isophthaloyl chloride, trimesoyl chloride, trimellitoyl chloride and terephthaloyl chloride.

8. The high flux membrane of claim 1 in which said polar aprotic solvent is at least one member of the group consisting of N-methylpyrrolidone, 2-pyrrolidones, N,N-dimethylformamide, dioxane, pyridine, lutidines, picolines, tetrahydrofuran, sulfolane, sulfolene, hexamethylphosphoramide, triethylphosphite, N,N-dimethylacetamide, and N,N-dimethylpropionamide.

9. The high flux membrane of claim 8 in which said solvent is N-methylpyrrolidone.

10. The high flux membrane of claim 8 wherein the concentration of said solvent in said aqueous solution is about 0.01 to 75 wt. %.

11. The high flux membrane of claim 10 wherein the concentration of said solvent is 0.1 to 20 wt. %.

12. The high flux membrane of claim 11 wherein the concentration of said solvent is 1 to 20 wt. %.

13. The high flux membrane of claim 1 further characterized in that said aqueous solution contains an acid acceptor.

14. The high flux membrane of claim 1 in which the pH of said aqueous solution is in a range of from about 8 to about 14.

15. The high flux membrane of claim 1 in which the aqueous solution contains a polyamine in a concentration of about 0.1% to about 20% by weight and said organic solution contains a polyacyl halide in a concentration of about 0.01% to about 10% by weight.

16. The high flux membrane of claim 1 in which said curing conditions include a temperature in the range of from about 20° to about 150° C for a period of time in the range of from about 1 second to about 2 hours.

17. The high flux membrane of claim 1 further characterized in that said membrane is subjected to treatment with an alkaline compound.

18. The high flux membrane of claim 17 in which the cured membrane is washed at a temperature is in a range of from about 20°C to about 100°C.

19. A process comprising; preparing a semipermeable membrane providing increased flux while retaining salt rejection and chlorine resistance by coating on a porous support an aqueous solution of an aromatic polyamine which contains a polar aprotic solvent not reactive with amines having properties for dissolving or plasticizing said support and optionally an acid acceptor, removing excess solution, drying the surface of the coated support, contacting the dried surface of the coated support with an organic solution of an aromatic polycarboxylic acid halide to form a reaction product within and/or on the surface of said porous support and curing the resultant composite at curing conditions.

20. The process of claim 19 further comprising the steps of washing the cured membrane with an alkaline compound at an elevated temperature and pH, and recovering the resultant high flux semipermeable membrane.

* * * * *

REEXAMINATION CERTIFICATE (1565th)

United States Patent [19]

Chau

[11] B1 4,950,404

[45] Certificate Issued   Oct. 1, 1991

[54] HIGH FLUX SEMIPERMEABLE MEMBRANES

[75] Inventor: Michael M. Chau, San Diego, Calif.

[73] Assignee: Allied-Signal Inc., Morris Township, Morris County, N.J.

Reexamination Request:
No. 90/002,194, Nov. 7, 1990

Reexamination Certificate for:
Patent No.: 4,950,404
Issued: Aug. 21, 1990
Appl. No.: 400,440
Filed: Aug. 30, 1989

[51] Int. Cl.$^5$ .................. B01D 61/00; B01D 67/00; B01D 69/00
[52] U.S. Cl. ....................... 210/500.27; 210/500.37; 264/45.5
[58] Field of Search .............. 210/490, 500.37, 500.38, 210/500.39, 500.41, 653, 654; 264/45.5, 48, DIG. 48, DIG. 62

[56] References Cited

U.S. PATENT DOCUMENTS

| | | |
|---|---|---|
| 3,744,642 | 7/1973 | Scala et al. |
| 4,087,388 | 5/1978 | Jensen et al. |
| 4,520,044 | 5/1985 | Sundet |
| 4,661,254 | 4/1987 | Zupancic et al. |
| 4,719,062 | 1/1988 | Sundet |
| 4,761,234 | 8/1988 | Uemura et al. |
| 4,772,394 | 9/1988 | Swedo et al. |
| 4,885,091 | 12/1989 | Swedo et al. |
| 4,919,808 | 4/1990 | Swedo et al. |

*Primary Examiner*—Frank Sever

[57] ABSTRACT

High flux semipermeable membranes which comprise a polymerized reaction product within and/or on a porous support may be prepared by contacting the porous support such as a polysulfone sheet with an aqueous solution of an polyamine, said aqueous solution containing a polar aprotic solvent not reactive with amines and optionally an acid acceptor. The surface of the coated support is dried to the touch and then contacted with an organic solution of an polycarboxylic acid halide for a period of time sufficient to form a polymerized reaction product within and/or on the surface of the support material. The resulting composite may be post treated by washing with an alkaline compound. The resultant membrane composite may be used in separation processes such as the desalination of brackish or seawater, or the softening of domestic hard water.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 19 are determined to be patentable as amended.

Claims 2-18 and 20, dependent on an amended claim, are determined to be patentable.

1. A semipermeable membrane having properties for providing increased flux while retaining salt rejection and chlorine resistance prepared by *first forming a porous solid support and directly thereafter* coating [a] *said* porous support with an aqueous solution of [an] *a* polyamine or bisphenol which contains a polar aprotic solvent not reactive with amines *and* having properties for dissolving or plasticizing said support *in an amount sufficient to increase the flux relative to a membrane prepared in the absence of said polar aprotic solvent while retaining salt rejection and chlorine resistance*, removing excess of said solution, contacting the coated porous support with an organic solvent solution of an polyacyl halide, polysulfonyl halide, or polyisocyanate to form a reaction product within and/or on the surface of said porous support, and curing the resulting composite at curing conditions to form said high flux semipermeable membrane.

19. A process comprising; preparing a semipermeable membrane providing increased flux while retaining salt rejection and chlorine resistance by *first forming a porous solid support and directly thereafter* coating on [a] *said* porous support an aqueous solution of an aromatic polyamine which contains a polar aprotic solvent not reactive with amines *and* having properties for dissolving or plasticizing said support *in an amount sufficient to increase the flux relative to a membrane prepared in the absence of said polar aprotic solvent while retaining salt rejection and chlorine resistance* and optionally an acid acceptor, removing excess solution, drying the surface of the coated support, contacting the dried surface of the coated support with an organic solution of an aromatic polycarboxylic acid halide to form a reaction product within and/or on the surface of said porous support and curing the resultant composite at curing conditions.

* * * * *